(12) United States Patent
Bao et al.

(10) Patent No.: US 8,968,694 B2
(45) Date of Patent: Mar. 3, 2015

(54) METHOD FOR PREPARING HIGH PURITY AMMONIA

(75) Inventors: Jianren Bao, Wuhan (CN); Lingqi Zeng, Wuhan (CN); Zehua Zhu, Wuhan (CN)

(73) Assignee: Hunan HiEND Products Co., Ltd., Hunan (CN)

( * ) Notice: Subject to any disclaimer, the term of this patent is extended or adjusted under 35 U.S.C. 154(b) by 86 days.

(21) Appl. No.: 13/377,646

(22) PCT Filed: Apr. 30, 2010

(86) PCT No.: PCT/CN2010/072389
§ 371 (c)(1),
(2), (4) Date: Jan. 9, 2012

(87) PCT Pub. No.: WO2010/142174
PCT Pub. Date: Dec. 16, 2010

(65) Prior Publication Data
US 2012/0100063 A1    Apr. 26, 2012

(30) Foreign Application Priority Data
Jun. 12, 2009  (CN) .......................... 2009 1 0062709

(51) Int. Cl.
*C01C 1/04* (2006.01)
*C01B 3/04* (2006.01)
(Continued)

(52) U.S. Cl.
CPC . *C01B 3/047* (2013.01); *C01B 3/50* (2013.01); *C01C 1/024* (2013.01); *C01C 1/0405* (2013.01);
(Continued)

(58) Field of Classification Search
CPC ...... C01C 1/04; C01C 1/0405; C01C 1/0411; C01C 1/0417; C01C 1/0423; C01C 1/0429; C01C 1/0435; C01C 1/0441; C01C 1/0447; C01C 1/0452; C01B 3/02; C01B 3/025; C01B 3/04; C01B 3/047; C01B 3/50–3/505; C01B 3/508
USPC ........................ 423/352, 359–363, 356, 658.2
See application file for complete search history.

(56) References Cited

U.S. PATENT DOCUMENTS 6,524,544 B1 * 2/2003 Alvarez et al. ................ 423/352
2005/0019244 A1   1/2005 Spiegelman et al.

FOREIGN PATENT DOCUMENTS

| CN | 1087319 | 6/1994 |
| CN | 1907855 | 2/2007 |
| CN | 101575102 | 11/2009 |
| RO | 116071 | 10/2000 |
| WO | WO 2008002593 A2 * | 1/2008 |

OTHER PUBLICATIONS

Google Translation of CN 1907855.*
(Continued)

*Primary Examiner* — Stanley Silverman
*Assistant Examiner* — Justin Bova
(74) *Attorney, Agent, or Firm* — Rankin Hill & Clark LLP

(57) ABSTRACT

A method for preparing high purity ammonia is provided, which comprises the following three steps of: (1) obtaining the required feed gases (i.e., hydrogen-nitrogen gas mixture) by catalytic cracking ammonia; (2) purifying the hydrogen-nitrogen gas mixture; and (3) synthesizing high purity ammonia by using the hydrogen- nitrogen gas mixture with high purity. In the provided method, the obtained ammonia with undesired purity is fed back to an ammonia catalytic cracking unit. The whole production system is a closed system without any discharging of ammonia and thus is environment friendly. Each step of the method can reduce cost.

8 Claims, 2 Drawing Sheets

(51) Int. Cl.
*C01B 3/50* (2006.01)
*C01C 1/02* (2006.01)
*C01B 21/04* (2006.01)

(52) U.S. Cl.
CPC . *C01B 2210/0065* (2013.01); *C01B 2210/0062* (2013.01); *C01B 2210/0045* (2013.01); *C01B 21/0405* (2013.01); *C01B 2210/0082* (2013.01); *C01B 2203/0465* (2013.01); *C01B 2203/0475* (2013.01); *C01B 2203/048* (2013.01); *C01B 2203/0495* (2013.01); *Y02E 60/364* (2013.01)
USPC ........................................ 423/359; 423/658.2

(56) References Cited

OTHER PUBLICATIONS

Felder et al, "Elementary Principles of Chemical Processes," 2005, John Wiley & Sons, Inc., Third Edition, p. 110.*
Lovegrove et al, "Developing ammonia based thermochemical energy storage for dish power plants," 2004, Solar Energy Issue 76, pp. 331-337.*
International Search Report of PCT/CN2010/072389 dated Jul. 29, 2010.
International Preliminary Report on Patentability of PCT/CN2010/072389 dated Dec. 22, 2011.

* cited by examiner

METHOD FOR PREPARING HIGH PURITY AMMONIA

TECHNICAL FIELD

The present invention relates to an integrated three-step method for preparation of high purity ammonia comprising catalytic cracking of ammonia, purification of hydrogen-nitrogen gas mixture and ammonia synthesis. High purity ammonia is often used in synthesis of nitrides, and is normally applicable to manufacturing industries such as photoelectronics, solar batteries, microelectronics, liquid crystal display, super-hard ceramics, biology and pharmaceutics.

BACKGROUND ART

Current developments of microelectronics and optoelectronics industries have made higher requirements on quality of nitrides, especially gallium nitride (GaN) and silicon nitride ($Si_3N_4$). GaN is regarded as the basis of new-generation light-emitting diode (LED). GaN epitaxial wafers, which may be used for manufacturing blue and green LEDs and blue light lasers, are currently prepared by reacting trimethyl Gallium ($Ga(CH_3)_3$) with high purity ammonia ($NH_3$) under high temperature in MOCVD (Metal Organic Chemical Vapor Deposition). As an insulating material, $Si_3N_4$ is widely used in fields of for example, ICs (Integrated Circuits), LCD (liquid crystal display) and solar cells. $Si_3N_4$ is deposited by reacting the high purity $NH_3$ with $SiH_4$. In addition, the high purity ammonia is widely used in fields of super-hard ceramics (e.g. BN), biology and pharmaceutics.

In the synthesis of top-quality nitrides, high purity ammonia has to be used, as the purity of ammonia has a great impact upon the above industries. In the preparation of silicon nitride, for instance, instead of $Si_3N_4$, silicon oxide ($SiO_2$) will be formed if as little as 50 ppm of water or oxygen appears in the ammonia used. Also for example, in GaN MOCVD, light-emitting wavelength of resulted epitaxial wafers will be uncontrollable if the ammonia used contains 3 ppm of water or oxygen. For development of optoelectronics and microelectronics industries, the development of basic raw materials represented by high purity ammonia becomes extremely important.

In order to obtain high quality nitrides used in microelectronics industry, the purity requirement on ammonia should be very high. The following table shows the typical indexes of high purity ammonia currently used and boiling points of some common impurities.

TABLE 1

Typical Indexes of Gaseous 6N and 7N Ammonia (ppb)

| $NH_3$ | $Ar + O_2$ | $CO_2$ | CO | $CH_4$ | $H_2O$ | Total |
|---|---|---|---|---|---|---|
| 6N (99.9999%) | <120 | <100 | <50 | <50 | <200 | <1000 |
| 7N (99.99999%) | <20 | <50 | <10 | <10 | <25 | <100 |

TABLE 2

Boiling Points of Ammonia and some Common Impurities

| Gas | $H_2$ | $N_2$ | Ar | $O_2$ | $CH_4$ | $CO_2$ | $NH_3$ | $H_2O$ |
|---|---|---|---|---|---|---|---|---|
| Boiling Point (K) | 20.27 | 77.35 | 87.5 | 90.2 | 116.7 | 195.2 | 239.8 | 373.2 |

Molecular weights of these substances do not differ greatly, in which case, the boiling point of each substance usually reflects its molecular interactions. For the polar molecules such as water and ammonia, the stronger the molecular interaction is, the higher the boiling point is; while for the non-polar molecules such as $H_2$ and $N_2$, the weaker the molecular interaction is, the lower the boiling point is. In the case of the non-polar molecules, the smaller the molecular weight is, generally the lower the boiling point is. For instance, boiling point of $H_2$ is lower than those of $N_2$ and $O_2$. However, there are some exceptions like $CH_4$, which is of smaller molecular weight compared with $N_2$ and $O_2$, yet of higher boiling point, since the molecule of $CH_4$ is composed of 5 atoms, and has a larger molecular volume, hence has a stronger molecular interaction.

There is a wide difference between the polar molecule and the non-polar molecule in the strength of the molecular interactions, which is reflected not only in the boiling points, but also in the gas purification processes, i.e. it is more difficult to purify polar molecular gases (e.g. $NH_3$) than non-polar molecular gases (e.g. $H_2$ and $N_2$). If the purification of polar molecular gas (e.g. $NH_3$) can be converted to the purification of non-polar molecular gas (e.g. $H_2$ and $N_2$), it will be easier to obtain the polar molecular gas of high purity.

It's shown in the above table that the boiling point of ammonia is neither the highest nor the lowest among ammonia and its impurities. Therefore, to purify the ammonia, a two-step process has to be used in the art, in which low boiling point impurities like $O_2$ and $CO_2$ are firstly removed in an adsorption step, and then substances with boiling point higher than that of ammonia, such as $H_2O$, are removed in a distillation or adsorption step.

The most arduous task in the technology for obtaining high purity ammonia lies in elimination of water in the ammonia. Since both $NH_3$ and $H_2O$ are polar molecules, they are bound together by hydrogen bonds. Because of the saddle-shaped purification curve for water in the purification of $NH_3$, it is difficult to obtain the ammonia with the content of $H_2O$ lower than 1 ppm. Therefore, to remove trace of water from $NH_3$ by common processes is extremely difficult. Almost all technologies and patents aimed at obtaining high purity ammonia are focused on the elimination of water.

Currently the most popular method for preparation of the high purity ammonia is purifying the low purity ammonia by first obtaining ordinary purity ammonia by synthesizing ordinary purity $N_2$ and $H_2$, and then getting high purity ammonia through purification, as is detailed in patent applications 'On-site generation, purification, and distribution of ultra-pure anhydrous ammonia' (Matheson Tri-gas Co., Ltd. Chinese patent application No. 200580022983.8) and 'Process for purifying ammonia' (JAPAN PIONICS, Chinese patent application No.01124353.8).

In preparing high purity ammonia by using ammonia purification method, the kinds and contents of impurities vary with the sources of the ammonia, which are generally as listed below: oil, ~2000 ppm; $N_2$, ~2000 ppm; $H_2$, ~2000 ppm; $H_2O$, 300~600 ppm; $CH_4$, 600~800 ppm; $O_2+Ar$, 50~200 ppm. For the high purity ammonia used in microelectronics, $H_2O$, $O_2$ and oil are the most harmful substances, which must be removed to ensure that their contents meet the requirements.

While the price of ordinary ammonia is quite low, high purity ammonia is very expensive. It is very difficult to obtain high purity ammonia by purifying ordinary ammonia because the bonding between the impurities and ammonia is so strong that it is hard for them to be separated physically or chemically. Among all these impurities, oxygen-containing impurities, primarily $O_2$ and $H_2O$, especially $H_2O$, are the most difficult impurities to remove, while contents of oxygen-containing impurities are the most important indexes indicating the quality of high purity ammonia.

In brief, there are many kinds of impurities in ordinary ammonia, especially oxygen-containing impurities, which are very difficult to remove, hence the ammonia purification is rather difficult and the price of high purity ammonia is extremely high.

SUMMARY OF THE INVENTION

The present invention aims to provide an integrated three-step method for the preparation of high purity ammonia comprising catalytic cracking of ammonia, purification of hydrogen-nitrogen gas mixture, and ammonia synthesis. The method not only provides ammonia of purity ranging up to from 99.999% to 99.9999999%, but also is cost effective and environment friendly. This method applies to the construction of a plant for manufacturing high purity ammonia.

The technical solution of the present invention is a three-step method for the preparation of high purity ammonia which comprises catalytic cracking of ammonia, purification of hydrogen-nitrogen, and ammonia synthesis, and characterized by the following three steps: step one, catalytic cracking ammonia to get a hydrogen-nitrogen gas mixture, i.e. the feed gases; step two, purifying the hydrogen-nitrogen gas mixture; and step three, synthesizing high purity ammonia using the purified hydrogen-nitrogen gas mixture with high purity.

The method stated above is further characterized in that the final purity of the synthesized high purity ammonia is up to 99.999%~99.9999999%.

The method stated above is further characterized in that the three steps make up a recycling system which can produce high purity ammonia from industrial-grade low purity ammonia; the system is a closed system for the ammonia with undesired purity. The system outputs high purity ammonia with the desired purity while feeds the synthesized ammonia with undesired purity back to a catalytic cracking unit.

The method stated above is further characterized in that in the step one, the feed gases required for synthesizing high purity ammonia is obtained by catalytic cracking industrial-grade low purity ammonia, and the hydrogen-nitrogen gas mixture contains 75% $H_2$ and 25% $N_2$ after impurities are removed.

The method stated above is further characterized in that in the step two the hydrogen-nitrogen gas mixture is purified through cryogenic or adsorption purification technology to remove various impurities and a high purity hydrogen-nitrogen gas mixture with purity up to 99.999% to 99.9999999% is obtained.

The method stated above is further characterized in that in the step three the high purity hydrogen-nitrogen gas mixture is used to synthesize high purity ammonia with the purity up to 99.999%~99.9999999% through Haber process.

The method stated above is further characterized in that the purity of synthesized high purity ammonia may be 99.9999% or higher.

The three-step method for the preparation of high purity ammonia which comprises catalytic cracking of ammonia, purification of hydrogen-nitrogen gas mixture and ammonia synthesis according to the present invention is applicable to construction of high purity ammonia plants with production scale ranging from dozens of tons to tens of thousands of tons, preferably from hundreds to thousands of tons.

As stated above, the principle of the present invention is utilizing the fact that the boiling points of $N_2$ and $H_2$ are the lowest in these above mentioned gases. in order to obtain the high purity ammonia, a gas mixture (mainly comprising $H_2$ and $N_2$ at a ratio of 3:1, and some other impurities, including $H_2O$) is first obtained by catalytically cracking the low purity ammonia, high purity $H_2$ and $N_2$ with low boiling points are separated from the gas mixture and then the high purity ammonia is synthesized from the high purity $H_2$ and $N_2$. This is an ideal way to obtain high purity ammonia, and is referred to as 'an integrated three-step method for preparation of high purity ammonia' (including catalytic cracking of ammonia, purification of hydrogen-nitrogen gas mixture and ammonia synthesis) herein. Ultra-high purity ammonia is expected to be obtained through the present invention.

Step One: Catalytic Cracking of Ammonia

Catalytic cracking of ammonia has been widely used to prepare the hydrogen-nitrogen gas mixture or hydrogen. The key technology in ammonia catalytic cracking is the selection of catalyst. The main catalysts for catalytic cracking of ammonia is supported catalysts including transition metal catalysts delegated by iron-nickel and precious metal catalysts represented by ruthenium (Ru). The iron-nickel catalysts enjoy the advantage of low-price, easy preparation and good stability.

Hydrogen preparation by ammonia decomposition reaction is relatively simple. The reaction equation is as follows:

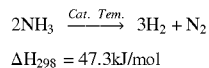

$$2NH_3 \xrightarrow{Cat.\ Tem.} 3H_2 + N_2$$
$$\Delta H_{298} = 47.3 kJ/mol$$

Only three materials, i.e., $NH_3$, $N_2$ and $H_2$, are involved in the balance system. As the reaction is weak endothermic and volume-increasing, high temperature (HT) and low pressure are favorable conditions for ammonia decomposition. The conversion rates of ammonia decomposition at different temperatures and pressures are calculated based on thermodynamic constants of the reaction. Under atmospheric pressure and at 400° C., ammonia conversion rate can be higher than 99%, indicating that it is possible to get a high conversion rate at a lower temperature. The ammonia conversion rate changes little with a further increase of the reaction temperature. When the temperature goes up to 600° C., the ammonia conversion rate is found to be higher than 99.9%, almost complete decomposition is achieved.

Step Two: Purification of Hydrogen-Nitrogen Gas Mixture

Components of the gas mixture obtained by catalytic cracking low purity ammonia are mainly $H_2$ and $N_2$ at the ratio of 3:1, and the remaining substances are impurities including $H_2O$, $O_2$, hydrocarbons ($CH_4$), Ar, etc. As noted above, the boiling points of $H_2$ and $N_2$ are the lowest among all components, because $H_2$ and $N_2$ are composed of non-polar molecules with weak inter-molecular interaction, and meanwhile the interaction between $H_2$ or $N_2$ molecular and other impurity molecules is weak, too. Therefore separation of impurities from $H_2$ and $N_2$ is easier than from ammonia. And the 3:1 ratio of $H_2$ to $N_2$ remains after purification. There are a variety of processes and proven technologies for the purification of the gas mixture. The following are some purification technologies relevant to high purity ammonia preparation.

Cryogenic purification: as the boiling points of $H_2$ and $N_2$ are the lowest, cryogenic purification may be adopted to purify the gas mixture obtained by cracking ammonia. Cryogenic purification can separate gases with different boiling points and is applicable in large-scale industrial production with the advantages of large throughput and high purity, but is suitable to only large-scale industrial production because of complex process, large investment, high requirements on the equipments and large occupation of lands.

Adsorption purification: adsorption purification has become a simple and effective gas separation technology. Due to its small-scaled investment and occupation of lands, as well as well developed equipments and processes, adsorption purification is more suitable for medium and small scale manufacture of high purity ammonia.

Adsorption usually refers to treatment of fluid mixture with porous solid adsorbent, to make one or more components of the fluid mixture be adsorbed onto the surface of the solid to achieve separation. Adsorption can be divided into two categories: chemical adsorption and physical adsorption. For example, $O_2$, one of the impurities, may be first removed through chemical adsorption ($O_2$ is reacted with under palladium-catalyst to generate $H_2O$) and elimination of $H_2O$ via physical adsorption (desiccant). Thus $H_2O$ and $O_2$, the most harmful impurities in the mixture are removed. Other impurities can be removed similarly by different adsorbents.

The key to adsorption purification is the selection of adsorbents. Commonly used adsorbents include active aluminum oxides, silica gels, active carbons and molecular sieves, etc. Active aluminum oxides are solid with strong affinity for water, primarily applicable to gas drying. Silica gels have not only a strong affinity for water, but also a strong adsorption for components such as hydrocarbons and $CO_2$. Active carbons are broad-spectrum water-resistance/proof adsorbents which can massively adsorb various organic molecules with weak polarity or non-polarity. Zeolite molecular sieve adsorbents are crystalline meta-aluminosilicates containing alkaline earth elements, belong to strong polar adsorbent and have extremely strong adsorption selectivity because of a very uniform pore structure. For gases with complex composition, a variety of adsorbents are in practice often required, which are assembled layer by layer based on their adsorption properties to make up a composite adsorbent bed, in order to separate the components as required.

When using adsorption purification, regeneration of adsorbents should also be taken into consideration, therefore pressure swing adsorption with twin-column structure is adopted in the purification of gas mixture obtained by catalytic cracking ammonia. Adsorption capacities of various components in the gas mixture obtained by cracking ammonia to a special adsorbent (such as active aluminum oxide, active carbon, zeolite and silica gel) are in the order of $H_2O>CO_2>CO>CH_4>N_2>H_2$. With existing purification technologies, even with commercially available devices, hydrogen-nitrogen gas mixture with a purity of 99.999%~99.9999999% can be obtained by removing various impurities through deoxidation, adsorption, and etc. After adsorption purification, the content of impurities in the gas mixture can be less than 1 ppb, and the content of $H_2$ and $N_2$ in the gas mixture can be as high as 99.9999999%, while the ratio of $H_2$ to $N_2$ remains at 3:1, i.e. 75% $H_2$ and 25% $N_2$ in the gas mixture.

Step three: ammonia synthesis

Chinese Patent application No. 200610019998.5 entitled "Method of High purity Ammonia Synthesis", describes in detail the direct synthesis of high purity ammonia from high purity $H_2$ and $N_2$. The present invention may adopt, but is not limited to, the common Haber process for ammonia synthesis. With the three-step method for preparing high purity ammonia according to the present invention, the manufacturing cost will be further reduced.

In the gas mixture obtained after the catalytic cracking of ammonia and the purification of hydrogen-nitrogen gas mixture, the $H_2$ to $N_2$ remains at a ratio of 3:1 that is the most ideal ratio for ammonia synthesis and thus no additional step of adjusting the ratio of $H_2$ to $N_2$ is needed. Hydrogen-nitrogen ratio is an important parameter in ammonia synthesis and the control over the hydrogen-nitrogen ratio has been a big problem in ammonia synthesis. Because there is a time interval between the feeding of the feed gases and the synthesizing of ammonia, a large time-lag system is formed. Without a well control over the large time-lag system, the efficiency of ammonia synthesis will decrease and energy consumption rate will increase. Therefore, if the hydrogen-nitrogen ratio in the feed gases is not 3:1 at which ratio hydrogen and nitrogen are consumed in the synthesis process, the synthesis of ammonia will stagnate because of the accumulation of excessive hydrogen or nitrogen. The present invention solves the problem of control over large time-lag system and greatly simplifies the control system, which will significantly reduce the cost for system control and operation.

Due to the extremely high purity (up to 99.9999999%) of the feed gases obtained in the step two, the purity of the synthesized ammonia could easily meet the existing high purity standard of 99.999%, which is 4 orders of magnitude lower than the purity of the feed gases, if not much of impurities are introduced in the synthesis process. In fact, maximum purity of ammonia obtained through existing low purity ammonia purification technologies is 99.99999% so far. The three-step method will top all existing low purity ammonia purification technologies and make ammonia purity up to the level of 99.999999%~99.9999999%. In short, the purity of ammonia synthesized by using high purity hydrogen-nitrogen gas mixture and the Haber's method may reach 99.999%~99.9999999%, generally higher than 99.9999%.

It is to be noted that, at the beginning of operation, the whole system for high purity ammonia synthesis may be not extremely clean, especially pipelines and containers which may always be contaminated by impurities. And when the catalyst is beginning to work, a lot of water may also be produced due to the reduction reaction between the catalyst and $H_2$. That is why the purity of the initially synthesized ammonia is low. However, as the system runs ceaselessly, various impurities and water will be continuously purified out of the system, and purity of the ammonia obtained will be constantly improved. Ammonia purity will eventually get up to or even higher than 99.999% after a few days to several weeks of operation. The reason is very simple: the feed gases for synthesizing ammonia comprises only $H_2$ and $N_2$ gas mixture of which the purity may reach 99.9999999%, and impurity does not come out of thin air.

Even if at the beginning or in the middle of operation, some other problems in the high purity ammonia synthesis system result in ammonia with undesired purity, the ammonia with undesired purity can be feed back to the step one as raw material. Thus the system constructed according to the three-step method constitutes a recycling system which is environment friendly without any discharging of ammonia. Ammonia is an irritant and toxic gas which may cause serious environment pollution if discharged improperly. Therefore ammonia must undergo a rigorous process of absorption and neutralization before being discharged, which means enormous investment in environmental conservation. However, the recycling system of the present invention naturally avoids the discharging of ammonia, hence less investment in environmental protection is necessary. Such a system is also in line with the philosophy of recycling economy vigorously advocated nowadays.

A specific process of the invention is as follows: liquid ammonia from ammonia tank is imported through a valve into a carburetor equipped with a water-bath heater of which the temperature is generally set at 45~60° C.; and the liquid ammonia is vaporized by the heat which comes from the water-bath and is transferred via pipe wall. Vaporization of liquid ammonia is also a purification process for the low purity ammonia, since some impurities will not be vaporized. The pressure of the vaporized ammonia is generally kept in a range of 0.4~0.5 MPa, and then reduced to 0.05 MPa after being depressurized by a pressure reducing valve. Then the ammonia is heated up to 800~850° C., and hydrogen-nitrogen gas mixture containing 75% and 25% $N_2$ is obtained from ammonia decomposition reaction catalyzed by iron-nickel catalyst.

The high temperature gas mixture flows into a heat exchanger and is cooled down to 70~150° C. Then the hydrogen-nitrogen gas mixture enters a catalytic deoxidator, in which catalyzed by palladium, the impurity oxygen reacts with hydrogen to form water that is condensed and then removed. After being cooled down to the room temperature and pressurized up to 0.5~0.8 MPa, this gas mixture is led into a hydrogen-nitrogen purifier in which $H_2O$, $O_2$, $CO_2$ and many other impurities in the gas mixture are eliminated through the silica gel-zeolite double-bed adsorption column. Usually a two-column process is adopted, with one column in operation while another in regeneration. The two columns switch periodically so that process goes on incessantly. The purity of the obtained hydrogen-nitrogen gas mixture can be up to 99.9999999%, with hydrogen-nitrogen ratio being 3:1.

After pressurization and heating, the hydrogen-nitrogen gas mixture is sent into an ammonia synthesizing tower and synthesized into ammonia in the presence of catalysts. The ammonia is then cooled down by a cool exchanger, and the obtained liquid ammonia goes into a storage tank while the un-reacted hydrogen-nitrogen gas mixture goes back into a compressor for another cycle. The purity of the final ammonia purity could he as high as 99.999%~99.9999999%, generally higher than 99.9999%.

Beneficial effects of this invention include that the cost for obtaining high purity ammonia is greatly reduced in each of the steps of the above described three-step method, which are principally shown in the following four aspects:

1. The cost for obtaining the feed gases is lowered down (step one: catalytic cracking of ammonia), as feed gases, high purity $H_2$ and $N_2$ are expensive if they are obtained separately. With this invention, the synthetic ammonia with undesired is feed back to the ammonia catalytic cracking unit for another cycle. The entire system is a closed system for ammonia with undesired purity and is environment friendly as well.

2. Cost for purification of the feed gases is reduced (step two: purification of hydrogen-nitrogen).

3. Cost for control and operation of ammonia synthesis is decreased (step three: ammonia synthesis).

4. Cost for system operation is lessened (systematic cycling, recycling).

DETAILED DESCRIPTION OF THE INVENTION

The present invention will be further described hereinafter in conjunction with the drawings and various embodiments.

Figure 2:
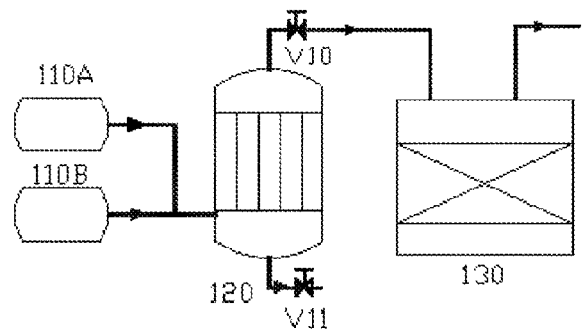
FIG. 2 is a schematic flow chart showing the ammonia catalytic cracking process according to an embodiment of the present invention.

Description of the reference numbers in FIG. 2: 110A, 110B: liquid ammonia storage tanks; 120: liquid ammonia vaporizer; 130: ammonia catalytic cracking furnace; V10, V11: regulating valves.

Figure 3:
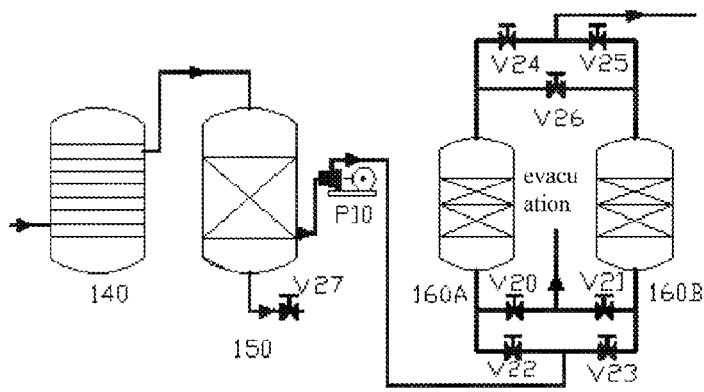
FIG. 3 is a schematic flow chart showing the purification process of the hydrogen-nitrogen gas mixture according to an embodiment of the present invention.

Description of the reference numbers in FIG. 3: 140: heat exchanger; 150: catalytic deoxidation column; 160A, 160B: temperature swing adsorption column; P10: compressors; V20, V21, V22, V23, V24, V25, V26, V27: regulating valves.

Figure 4:
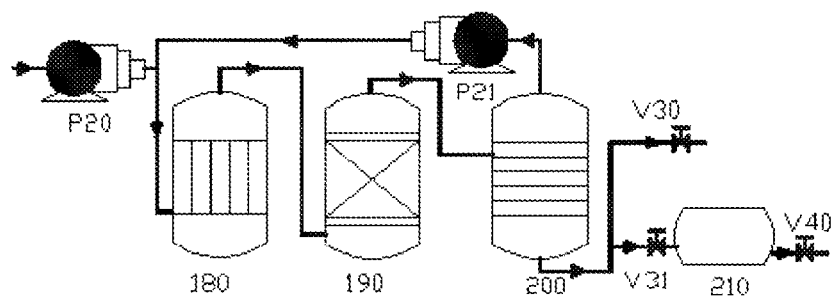
FIG. 4 is a schematic flow chart showing the ammonia synthesis process according to an embodiment of the present invention.

Description of the reference numbers in FIG. 4: 180: heat exchanger; 190: ammonia synthesis column; 200: ammonia cooling column; 210: ammonia storage tank; P20, P21: compressors; V30, V31, V40: regulating valves.

The integrated three-step method for high purity ammonia preparation according to an embodiment of the present invention comprises the following steps: step one, obtaining the feed gases—hydrogen-nitrogen gas mixture—required for synthesizing high purity ammonia by catalytic cracking industrial-grade low purity ammonia;

step two, removing various impurities from the hydrogen-nitrogen gas mixture by cryogenic purification or adsorption purification, especially by deoxidation and adsorption, to obtain a purified hydrogen-nitrogen gas mixture with a purity within a range of 99.999%~99.9999999%, the purified hydrogen-nitrogen gas mixture containing 75% $H_2$ and 25% $N_2$; and step three, synthesizing high purity ammonia using the high purity hydrogen-nitrogen gas mixture through Haber process, the purity of the ammonia being up to 99.999%~99.9999999%, generally higher than 99.9999%.

Figure 1:
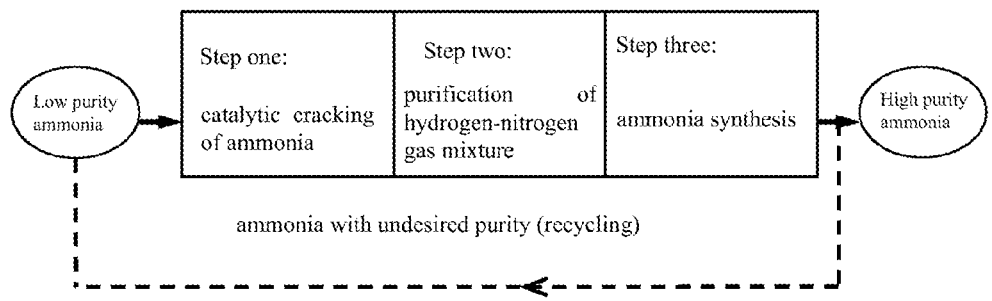
FIG. 1 is a flow chart illustrating the integrated three-step method for high purity ammonia preparation which comprises catalytic cracking of ammonia, purification of hydrogen-nitrogen gas mixture and ammonia synthesis according to an embodiment of the present invention.

As shown in FIG. 1, The three-step method for high purity ammonia preparation according to an embodiment of the present invention, which comprises catalytic cracking of ammonia, purification of hydrogen-nitrogen gas mixture and ammonia synthesis, can constitute a recycling system to obtain high-purity ammonia from industrial grade low purity ammonia. With the system, high purity ammonia can be output while ammonia with undesired purity will be fed back to the catalytic cracking unit of the system. The entire system is a closed cycle for ammonia with undesired purity and is environment-friendly.

FIG. 2 is a schematic flow chart showing the ammonia catalytic cracking process according to an embodiment of the present invention. Firstly, low purity ammonia is loaded into the liquid ammonia storage tanks 110A and 110B and then transported into the vaporizer 120 through the pipelines, in which it is heated up to 45~60° C. to be vaporized. The vaporized ammonia is transported to the ammonia catalytic cracking furnace 130 after passing through the pressure-regulating valve V10. In the ammonia catalytic cracking furnace 130, the ammonia flows through a Fe—Ni-based catalyst layer at 800~850° C. and is decomposed into a hydrogen-nitrogen gas mixture which is composed of 75% $H_2$ and 25% $N_2$.

FIG. 3 is a schematic flow chart showing the purification of the hydrogen-nitrogen gas mixture according to an embodiment of the present invention. The above mentioned high temperature hydrogen-nitrogen gas mixture passes through the heat exchanger 140 and is cooled down to 70~150° C. before being transported into the catalytic deoxidization column 150, where, under the action of Palladium catalyst, oxygen and hydrogen react to form water most of which is condensed in the catalytic deoxidization column and then removed. Before entering the adsorption columns 160A and 160B that comprise double layers of silica gel and zeolites, the hydrogen-nitrogen gas mixture is fed to the compressor P10 where its pressure is raised up to 0.5~0.8 MPa and its temperature kept at room temperature. The fine-pored silica gel particles are small-sized and closely spaced irregular granules which are glass-like, translucent and non-lustrous. Their pore diameters are about 20 Angstrom, with a large specific surface area and a large adsorption rate for low humidity gas. The lower layer is the molecular sieve layer which can adsorb trace water and also impurities such as $CO_2$ therein. The two adsorption columns here work alternatively, i.e. one is in regeneration while the other in adsorption.

FIG. 4 is a schematic flow chart illustrating the ammonia synthesis process according to an embodiment of the present invention. The purified hydrogen-nitrogen gas mixture is pressurized up to about 11 MPa by the compressor P20 and then passed through the heat exchanger 180 where its temperature is increased to 300~450° C. The hydrogen-nitrogen gas mixture then enters into the ammonia synthesis column 190 where it is synthesized into ammonia in a catalyst bed through Haber process. The temperature of the synthesis reaction can be further controlled in the ammonia synthesis column 190. The generated high purity ammonia and the gas mixture are cooled down through multistage cooling in the ammonia cooling column 200 until the ammonia is cooled down to −20° C. or lower. The cooled ammonia is separated by a separation device and then enters the storage tank 210 or is switched into a production line. The un-reacted gases are fed to the compressor P21 for a new round of synthesis reaction. In addition, heat being transferred in the heating-up and cooling-down processes may be comprehensively utilized. The whole process can be under automatic control.

If, for some reason, the purity of the obtained synthetic ammonia is undesired, it will be fed into the storage tanks 110A and 110B through the regulating valve V30 to recycle in the system, without any discharging of ammonia.

The invention claimed is:

1. An integrated three-step method for preparing high purity ammonia, comprising:
    step one, catalytic cracking ammonia to obtain a hydrogen-nitrogen gas mixture;
    step two, purifying the hydrogen-nitrogen gas mixture; through cryogenic or adsorption purification and
    step three, synthesizing ammonia using the purified hydrogen-nitrogen gas mixture;
    wherein the method further comprises:
    outputting synthesized ammonia with desired purity, and
    recycling synthesized ammonia with a purity less than the desired purity back to the catalytic cracking step,
    the desired purity of the synthesized ammonia is in the range of 99.999% or higher.

2. The method according to claim 1, wherein, the desired purity of the synthesized ammonia is in the range of 99.999% to 99.9999999%.

3. The method according to claim 1, wherein, in said step one, the hydrogen-nitrogen gas mixture required for synthesizing high purity ammonia is obtained by catalytic cracking ammonia, and the hydrogen-nitrogen gas mixture contains 75% $H_2$ and 25% $N_2$ after impurities are removed.

4. The method according to claim 1, wherein, in the step two, the purified hydrogen-nitrogen gas mixture has a purity in the range of 99.999% to 99.9999999%.

5. The method according to claim 1, wherein, in the step three, the purified hydrogen-nitrogen gas mixture is used to synthesize high purity ammonia through Haber process, with the purity of the synthesized ammonia being in the range of 99.999% to 99.9999999%.

6. The method according to claim 2, wherein, the purity of synthesized high purity ammonia is 99.9999% to 99.9999999%.

7. The method according to claim 4, wherein, the purity of synthesized high purity ammonia is 99.9999% to 99.9999999%.

8. The method according to claim 5, wherein, the purity of synthesized high purity ammonia is 99.9999% to 99.9999999%.

* * * * *